Sept. 11, 1928.                     W. W. HAMILL                    1,684,316
                                  FLUID FLOW METER
                              Filed Oct. 12, 1922            3 Sheets-Sheet 1
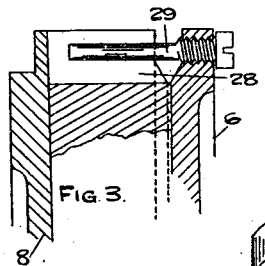
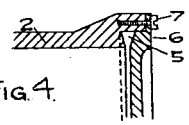
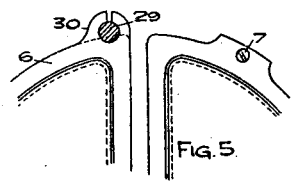
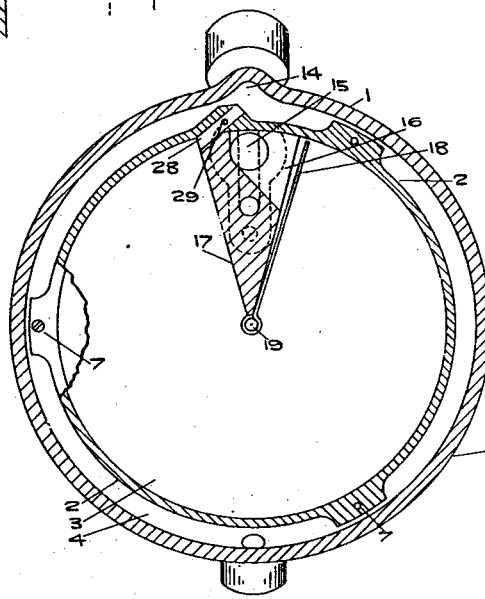
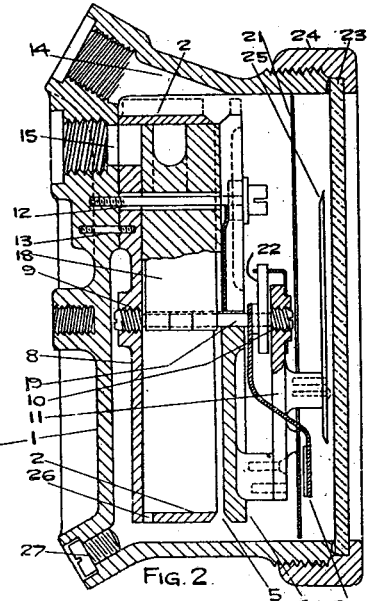
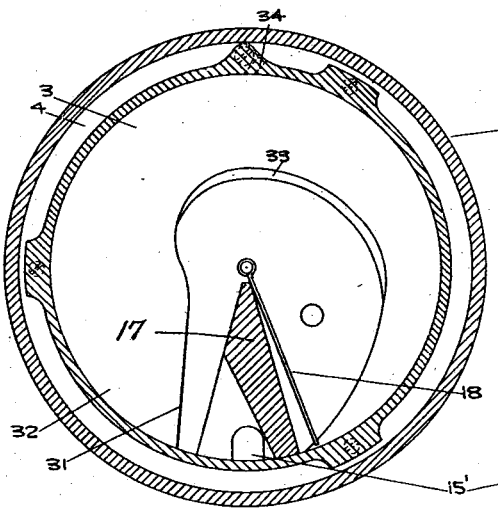
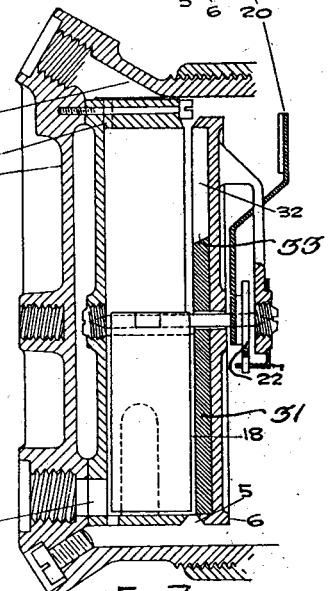

Sept. 11, 1928.   W. W. HAMILL   1,684,316
FLUID FLOW METER
Filed Oct. 12, 1922   3 Sheets-Sheet 2

Inventor
William W. Hamill
By James L. Norris
Attorney

Sept. 11, 1928. 1,684,316
W. W. HAMILL
FLUID FLOW METER
Filed Oct. 12, 1922    3 Sheets-Sheet 3

Inventor
William W. Hamill
By James L. Norris
Attorney

Patented Sept. 11, 1928.

1,684,316

UNITED STATES PATENT OFFICE.

WILLIAM WILSON HAMILL, OF BIRMINGHAM, ENGLAND.

FLUID-FLOW METER.

Application filed October 12, 1922, Serial No. 594,205, and in Great Britain October 28, 1921.

This invention relates to meters for indicating the rate of flow of fluids and which is of the type wherein the difference between pressures of the liquid at the inlet and outlet of the apparatus is compensated for. The invention will be described in the accompanying specification, illustrated in the attached drawings and more particularly pointed out in the appended claims.

In the accompanying drawings:

Figure 1 is a sectional elevation of a circular type of flow meter embodying the invention as viewed from the right of Figure 2.

Figure 2 is a vertical sectional view at a right angle to Figure 1.

Figure 3 is an enlarged fragmentary view showing means for calibrating the instrument shown in Figures 1 and 2.

Figure 4 is a fragmentary sectional view showing means for holding together certain components of the device shown in Figures 1 and 2.

Figure 5 is a front view of the portion of the cover of the supply chamber.

Figure 6 is a view similar to Figure 1 of a modified type of instrument as viewed from the left of Figure 7, the vane being shown in the position it assumes during maximum rate of flow of fluid through the instrument.

Figure 7 is a vertical section, at a right angle to Figure 6, of the modified type of instrument shown in the latter figure.

Figures 8, 9:
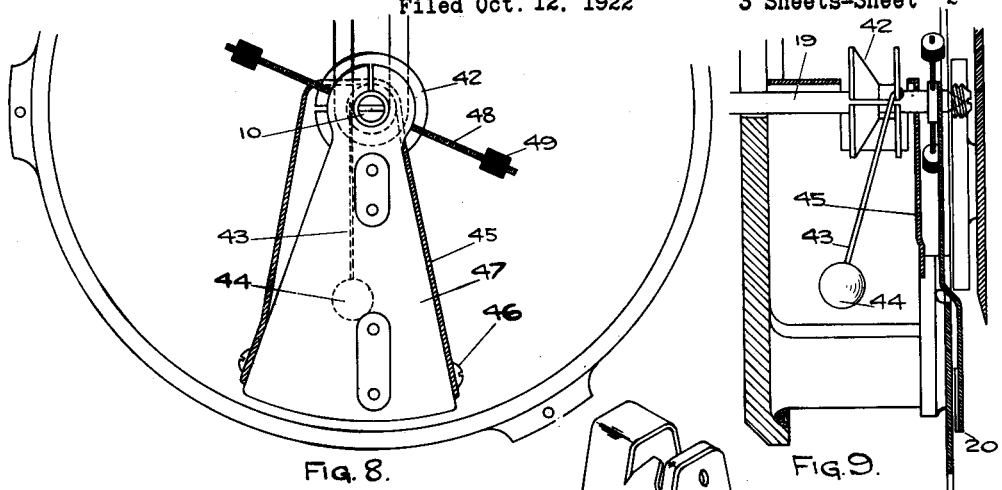
Figure 8 is an elevation of a modification in which a weight, instead of a spring, is used as resistance to the movement of the measuring member.
Figure 9 is a part sectional view, at right angles to Figure 8, of the resistance means and associated parts shown in the latter figure.
Figure 10:
Figure 10 is a perspective view of the cage in which the weight shown in Figures 8 and 9 is confined.

In the drawings Figures 1 to 5 is illustrated a circular type of instrument in which a housing or casing 1 accommodates an annulus 2 to form a supply chamber 3 within said annulus and a delivery chamber 4 between the exterior of said annulus and the interior of the housing or casing 1, communication between the supply chamber and the delivery chamber being by way of a slit 5 around the perimeter of the annulus. Said slit or opening 5, referred to hereinafter as the measuring opening, may conveniently be constituted by one facial edge of the annulus 2 and the adjacent facial edge of a cover 6, secured to the annulus by screws 7 (Figs. 1 and 5). The edges forming the measuring opening are chamfered outwardly as shown. The annulus 2 is closed on the side opposite to the measuring opening 5 by a wall 8 which carries one of the pivots 9 of the spindle of the indicating finger, the other pivot 10 being supported upon a bracket 11 attached to the cover 6. To avoid distortion, the inner assembly (comprising the annulus, the cover 6, and the parts carried by the latter) is secured in the casing 1 by a single screw 12 and a dowel peg 13. From the upper portion of the casing an outlet 14 carries away the fluid from the space between the annulus 2 and the casing 1, and immediately below the outlet 14 is positioned an inlet 15 through which the fluid passes into a small ante-chamber 16 communicating with the supply chamber 3. A partition 17 is provided adjacent to the ante-chamber 16 to divert the fluid in the required direction. Mounted to turn on the pivots 9, 10 is the spindle 19 of an obstacle vane partition plate or measuring member 18 which fits as closely within the supply chamber 3 as convenient manufacturing tolerances will allow, the spindle 19 of the measuring member being extended beyond the front or outer face of the cover 6 and provided with an indicating finger 20 which moves over a graduated dial 21 carried by the cover 6, in opposition to a spring 22.

The front or open end of the casing 1 is provided with a transparent closure disc 23 held in position by a screwed cap 24 to enable the movement of the indicating finger 20 to be observed, the whole of the moving parts within the casing 1 being surrounded by the fluid. A disc 25 is secured to the bracket 11 to hide the central portion of the instrument which is not covered by the graduated disc 21. An aperture 26 is formed in the bottom of the supply chamber 3 for the egress of foreign matter which may be withdrawn from the casing 1 through a drain plug 27 in the bottom of the casing 1. To control the character of the scale and particularly where a uniform scale is desired, a shunt or bye-pass aperture 28 is formed in that part of the supply chamber 3 on the opposite side of the partition 17 from the inlet 16 and communicating with the delivery chamber 4 in the vicinity of the outlet 14 from the casing 1, said aperture 28 having an influence upon the scale in accordance with its area which, for convenience in manufacture, may be varied by an obturating screw 29 (Figures 3 and 5) adjustably screwed into a split lug 30 in the cover 6. The fluid enters the instrument through the inlet 15, passes into the ante-chamber 16 and rotates the measuring member on its pivots 9 and 10 against the resistance of its spring 22 to an extent governed by the difference between the pressure at the inlet and that at the outlet of the apparatus. Fluid thus entering the supply chamber 3 passes through the measuring opening 5 into delivery chamber 4, the position to which the measuring member 18 is moved being a measure of the rate of flow. When the apparatus is to be used for measuring the flow of liquids, air or other gaseous extraneous media which may be present in the liquid is carried away with the liquid and the flow-ways or passages are arranged to avoid pockets which might entrap such extraneous media. If lodgement of such media occurred, the specific gravity of the moving parts would vary and inaccurate and fluctuating readings would result. As will be seen from the illustration, the position of the inlet 15 below the outlet 14 facilitates the automatic and continuous withdrawal of extraneous media. The pressure exerted by the fluid between the measuring member 18 and that part of the supply chamber 3 remote from the inlet 16 is modulated by the regulable bye-pass 28 and the instrument is thus calibrated according to requirements.

Figures 11, 12, 13:
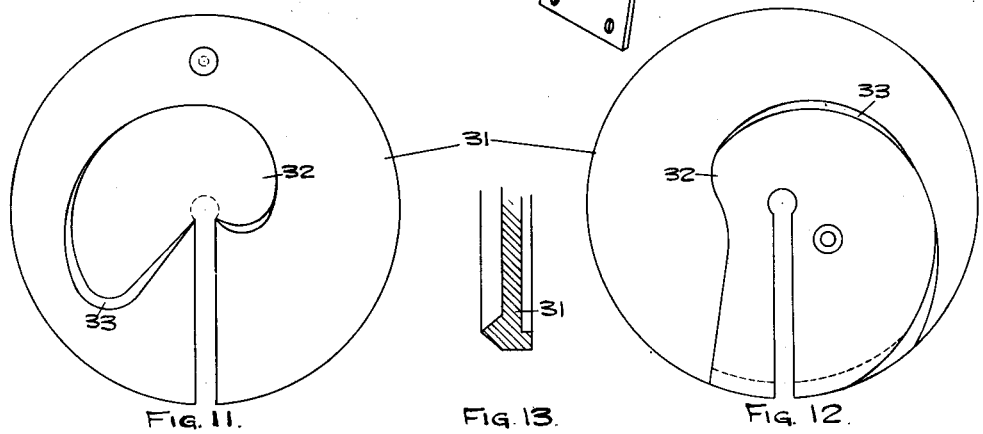
Figures 11 and 12 are elevations of a modified form of scroll plate shown in Figures 6 and 7.
Figure 13 is an enlarged sectional view of the rim of the plate shown in Figure 12.

In the modification shown in Figures 6 and 7, the bye-pass or shunt passage or balance port is arranged laterally, a plate 31 being positioned adjacent to the cover 6 and cut away to afford a peculiarly-shaped passage 32 between the inner face of the cover 6 and the outer edge of the measuring member 18, through which passage the fluid may bye-pass around the measuring member 18 and gain access to a part of the supply chamber which it would not normally do, the active area of the measuring opening 5 and the area of the shunt or modulating passage 32 determining the position the measuring member will occupy for a given flow. The shape of the modulating aperture 32 in the modulating plate 31 is determined by experiment for the particular scale needed, the one shown providing a uniform scale. It will be observed that, at the position of maximum flow, the influence of the modulating passage 32 is zero while at positions of smaller flows the effect is considerable. The modulating passage 32 may be varied in shape as indicated in Figures 11 and 12 and in all cases it is advantageous to chamfer or bevel the edges 33 of the modulating plate where particles of foreign matter might otherwise settle. In the embodiment of the invention shown in Figures 6 and 7 the inlet 15' is at the lower portion of the instrument, but in common with the preceding embodiment is below the outlet 14. When the apparatus is to be used for measuring the rate of flow of a liquid, a venting aperture 34 is provided at the highest point of the supply chamber 3 to enable gaseous extraneous media to pass away with the liquid through the outlet 14.

Figure 17:
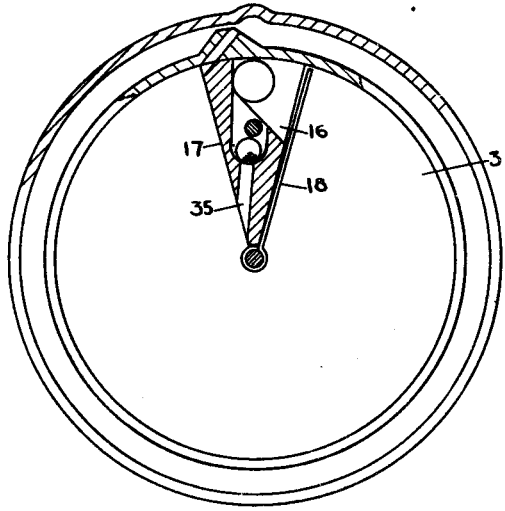
Figures 17 and 18 are sectional views showing part of the instrument shown in Figure 1 provided with release or non-return valves intended to avoid damage to the instrument in case of back pressure.
Figure 18:
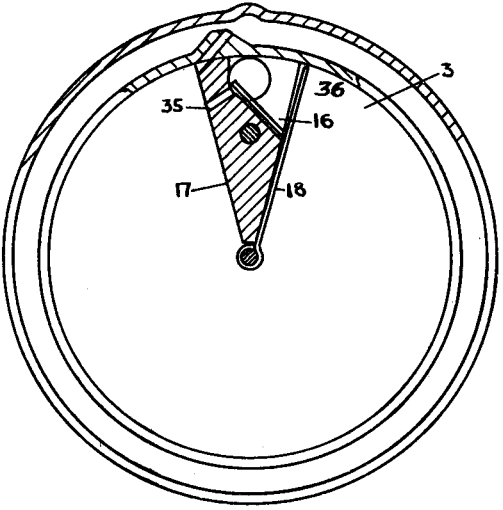

A non-return valve may be embodied so that in case of reversal of flow such as connecting up the wrong way damage is averted. Figures 17 and 18 show a duct 35 formed in the partition 17 to connect that part of the supply chamber 3 on the opposite side of said partition from the ante-chamber 16 with said ante-chamber, a flap valve 36 being shown in Figure 18 and a ball valve 37 being shown in Figure 17.

Figures 14, 15, 16:
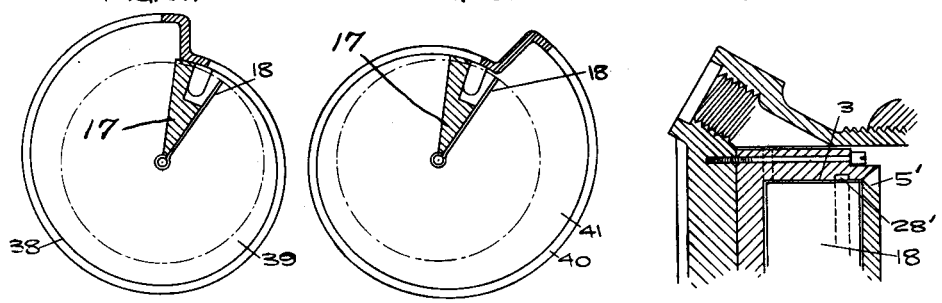
Figures 14 and 15 are diagrammatic views of modified forms of the supply chamber shown in Figures 1, 2, 6 and 7, the chamber in which the measuring member moves being of spiral shape.
Figure 16 is a fragmentary sectional view showing fluid flow passages in alternative position from those of Figure 7.

In a modification shown diagrammatically in Figure 16 the measuring opening 5' is arranged laterally, that is to say in such position that the fluid issues from the supply chamber in a direction more or less parallel to the axis of the instrument, and the modulating or shunt passage 28' is disposed in the inner periphery of the supply chamber 3. The cross sectional area of the shunt passage may be constant or varying according to the characteristics or type of scale desired.

Instead of making the supply chamber truly cylindrical, it may be of a shape which gradually increases the distance of its side wall from the centre, thereby gradually increasing the cross sectional area of the space 39 between the circular path of the extreme outer edge of the measuring member 18 and the inner adjacent wall of the supply chamber 38, as illustrated diagrammatically in Figure 14; or the supply chamber 40 may gradually close in towards the circular path of the measuring member 18' as illustrated diagrammatically in Figure 15, thus reducing the sectional area of the space 41 between said path and the wall of the chamber 40.

The cross sectional area available for the fluid to pass from the supply chamber into the delivery chamber determines the position of the measuring member for a given rate of flow; hence the internal form of the supply chamber, as well as the cross sectional area of the measuring opening, determines or controls the character of the scale. Thus in an instrument constructed according to Figures 1, 6, 17 and 18, wherein the peripheral wall of the measuring chamber is truly cylindrical, that is to say, where said wall is concentric with the axis of rotation of the vane 18 and the end of the vane is always in close proximity to said wall, the amount of increase or decrease of movement of the pointer across the dial per unit of rate of flow will be directly proportional to the increase of the unit of rate of flow of fluid through the slit 5 permitted by the position of the vane. On the other hand, where, as shown in Figure 14, the distance of the peripheral wall of the measuring chamber at its inlet end from the axis of rotation of the vane 18 is substantially equal to the length of said vane and such distance gradually increases toward the outlet of the apparatus, or, where, as shown in Fig. 15, the distance of the peripheral wall of the measuring chamber at its inlet end from the axis of rotation of the vane 18 is greater than the length of the vane and such distance gradually decreases toward the outlet of the apparatus where it is substantially equal to the length of the vane, the amount of movement of the pointer across the scale per unit of rate of flow will increase or decrease in proportion to the increase or decrease of the leakage of fluid between the outer end of the vane and the periphery of the measuring chamber and through the slit 5 permitted by the position of the vane in said chamber and the consequent distance of said end from the periphery of said chamber.

It will thus be seen that, where the measuring chamber is of the form shown in Figure 1, the graduations on the dial 21 must be equidistantly spaced; that, where the measuring chamber is of the form shown in Figure 14, each succeeding graduation on the dial 21 must be closer to the immediately preceding graduation than the latter is to the graduation which preceded it; and that, where the measuring chamber is of the form shown in Figure 15, each succeeding graduation on the dial 21 must be at a greater distance from the immediately preceding graduation than the latter is from the graduation which preceded it. Accordingly, the form of measuring chamber shown in Figure 1 may be used where it is not important that the particular rate of flow of fluid through the instrument may be easily noted; whereas the form of measuring chamber shown in Figure 14 may be used where it is desirable that only a low rate of flow of fluid through the instrument may be noted, and the form of measuring chamber shown in Figure 15 may be used where it is desirable that only a high rate of flow of fluid through the instrument may be easily noted.

Figure 20:
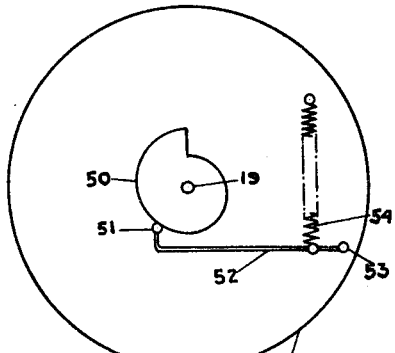
Figure 20 shows diagrammatically spring means for controlling the resistance to movement of the indicating finger, so as to provide a logarithmic scale.
Figure 19:
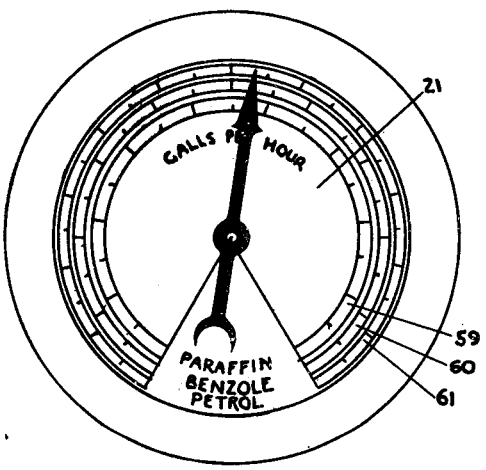
Figure 19 shows an instrument provided with a plurality of scales adapted for use with fluids of different specific gravities.
Figure 21:
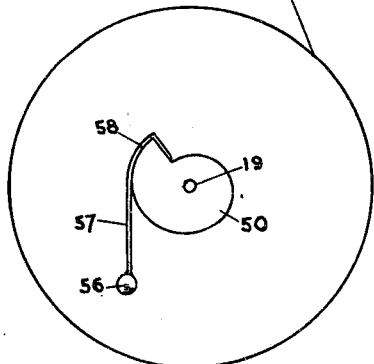
Figure 21 shows an arrangement similar to that shown in Figure 20 wherein a weight is substituted for a spring.

As a spring has the characteristic of an increasing resistance for unit deflection, it may, in certain cases, be desirable to provide means for exerting a constant opposing force to the movement of the measuring member. In Figures 8 and 9 the spindle 19 of the measuring member is shown as furnished with a flanged drum or pulley 42 from which a weight 44 is suspended by a cord 43. Said weight 44 may, when the instrument is installed on an automobile, assume various conditions of inclination, one of which is shown, and, in order that its movements may be controlled, it is surrounded by a sheet metal A-shaped cage 45 secured by screws 46 to the bracket 47 which carries the pivot 10 of the measuring member spindle. Two screw threaded arms 48, which extend radially from the measuring member spindle 19, are provided with adjustable nuts 49 for obtaining balance. In Figure 20 a cam 50 is shown as attached to the spindle 19 of the measuring member, the active part of said cam contacting with a roller 51 on one extremity of a lever 52 pivoted at 53 to the casing 1. A coiled tension spring 54 has one end connected to the lever 52 and its other end connected to the casing 1 or other fixed part. It will be apparent that the contour of the cam will control the resistance which the spring offers to movement of the measuring member 18, and that the cam 55 may be reversed when a scale in the reverse sense is needed. Figure 21 illustrates diagrammatically the application of a weight 56, instead of a spring, to constitute the force of varying moment which returns the measuring member to zero, said weight being suspended by a cord 57 from the periphery 58 of the cam. Liquids of different specific gravity, such as paraffin, benzol and petrol, may be dealt with in one instrument by the provision of three concentric scales 59, 60 and 61 engraved or otherwise marked on the circular dial 21, as shown in Figure 19, which enables direct readings to be taken without recompensation and recalibration of the instrument.

The cover plate 6, as shown in Figs. 5, 11 and 12, has a radial slot which terminates at its inner end in a circular enlargement, through which circular enlargement, when the instrument is assembled, the spindle 19 extends. In assembling the instrument the spindle 19 and the measuring member 18 carried thereby are inserted through said slot in the cover plate 6 and the rear end of the spindle 19 is inserted in the bearing for that end of same which is carried by the rear wall 8 of the supply chamber 3. The cover plate 6 is then partially rotated to bring the opening for the screw 12 into alignment with the bore through the partition 17 and rear wall of the supply chamber provided for the reception of said screw. This partial rotation of the cover plate 6 causes the partition 17 to cover said slot and thus prevent fluid from passing from the supply chamber 3 through said slot into the space between the annulus 2 and the interior of the casing 1. Since the bearing for the forward end of the spindle 19 and the dial 21 are carried by the cover plate 6, by removing the screw 12 the plate 6, spindle 19, dial 21, measuring member 18, and annulus 2 may be removed as a unit from the casing 1 and, by removing the screws 7, the plate 6, together with the dial 21, spindle 19, and measuring member 18 may be removed as a unit from the annulus 2.

Having described my invention what I claim is:—

1. A flow meter, comprising a substantially cylindrical casing having a wall at its rear end and its forward end open and provided with an outlet at its upper portion, a substantially cylindrical member of smaller external contour than the interior of said casing, said cylindrical member having its rear end closed and its forward end open, the rear end of said member being detachably secured to the rear wall of said casing in substantially concentric relation with the latter, a cover plate for the forward end of said member, spaced from the latter to afford a passage for fluid from said member to the space between said member and the interior of said casing, said member and cover forming a supply chamber, a spindle extending through said cover and having its rear end journalled in the rear end of said member at approximately the center of said rear end, a journal for the forward end of said spindle carried by said cover, a vane in said supply chamber secured to said spindle, said vane being throughout its length of substantially the same width as the depth of said supply chamber and subject throughout its extent to the flow of fluid through said supply chamber, a partition extending from the axis of said supply chamber to the side wall of the latter, said vane in its normal position being in close proximity to said partition, said casing having an inlet opening and said cylindrical member having an inlet opening registering with that of the casing for admitting fluid into said chamber between said partition and said vane, means for returning said vane to normal position, a dial and a pointer associated with the front face of said cover and said vane, said dial and pointer being relatively movable during the movement of said vane, and transparent means detachably closing the forward end of said casing.

2. Apparatus according to claim 1 comprising means for modulating the flow of fluid from the space in the supply chamber behind the vane to the space between the supply chamber and the interior of the casing.

3. A flow meter, comprising a substantially cylindrical casing having a wall at its rear end and its forward end open and provided with an outlet at its upper portion, a substantially cylindrical member of smaller external contour than the interior of said casing, said cylindrical member having its rear end closed and its forward end open, the rear end of said member being detachably secured to the rear wall of said casing in substantially concentric relation with the latter, a cover plate for the forward end of said member spaced from the latter to afford a passage for fluid from said member to the space between said member and the interior of said casing, said member and cover forming a supply chamber, a spindle extending through said cover and having its rear end journalled in the rear end of said member at approximately the center of said rear end, a journal for the forward end of said spindle carried by said cover, a vane in said supply chamber secured to said spindle, said vane being throughout its length of substantially the same width as the depth of said supply chamber and subject throughout its extent to the flow of fluid through said supply chamber, a partition extending from the axis of said supply chamber to the side wall of the latter, said vane being normally in close proximity to one side of said partition, said casing having an inlet opening and said member having an inlet opening registering with that of the casing for admitting fluid into said chamber between said partition and said vane, means for returning said vane to normal position, a dial and a pointer associated with the front face of said cover and said vane, said dial and pointer being relatively movable during the movement of said vane, transparent means detachably closing the forward end of said casing, means detachably securing said cover plate to said cylindrical member, the rear wall of the casing having a screw-threaded bore in its front face and the cover, partition, and rear wall of the cylindrical member having aligned openings therethrough, a screw extending through said aligned openings and engaging said screw-threaded member for securing said cover, partition and cylindrical member to said casing, and means associated with said casing and said cylindrical member and cooperating with said screw to maintain said parts in correct relationship.

WILLIAM WILSON HAMILL.